(12) United States Patent
Scherbakov et al.

(10) Patent No.: US 12,237,642 B2
(45) Date of Patent: Feb. 25, 2025

(54) ULTRAHIGH POWER FIBER LASER SYSTEM WITH CONTROLLABLE OUTPUT BEAM INTENSITY PROFILE

(71) Applicant: IPG PHOTONICS CORPORATION, Oxford, MA (US)

(72) Inventors: Eugene Scherbakov, Oxford, MA (US); Valentin Fomin, Oxford, MA (US); Andrey Abramov, Oxford, MA (US); Mikhail Abramov, Oxford, MA (US); Dmitri Jagodkin, Oxford, MA (US)

(73) Assignee: IPG PHOTONICS CORPORATION, Marlborough, MA (US)

( * ) Notice: Subject to any disclaimer, the term of this patent is extended or adjusted under 35 U.S.C. 154(b) by 810 days.

(21) Appl. No.: 17/299,490

(22) PCT Filed: Dec. 3, 2019

(86) PCT No.: PCT/US2019/064251
§ 371 (c)(1),
(2) Date: Jun. 3, 2021

(87) PCT Pub. No.: WO2020/117816
PCT Pub. Date: Jun. 11, 2020

(65) Prior Publication Data
US 2022/0077648 A1 Mar. 10, 2022

Related U.S. Application Data

(60) Provisional application No. 62/774,846, filed on Dec. 3, 2018.

(51) Int. Cl.
*H01S 3/23* (2006.01)

(52) U.S. Cl.
CPC .................. *H01S 3/2383* (2013.01)

(58) Field of Classification Search
CPC .................................. H01S 3/2383
See application file for complete search history.

(56) References Cited

U.S. PATENT DOCUMENTS 5,566,196 A * 10/1996 Scifres ............... H01S 3/06708
372/6
7,391,561 B2 * 6/2008 Di Teodoro ........ H01S 3/06758
359/341.1

(Continued)

OTHER PUBLICATIONS

Liu et al., Coherent beam combining of high power fiber lasers: Progress and prospect, Sci China Tech Sci Jul. 2013 vol. 56 No. 7, 1597-1606, doi: 10.1007/s11431-013-5260-z (Year: 2013).*

(Continued)

*Primary Examiner* — Peter Radkowski
(74) *Attorney, Agent, or Firm* — Yuri B. Kateshov, Esq.

(57) ABSTRACT

The disclosed ultra-high power all fiber laser system is configured with multiple spaced apart fiber lasers outputting respective laser beams respective paths. The disclosed system is further configured with a tapered fiber-bundle including at least one central guiding fiber and a plurality of peripheral guiding fibers. The disclosed system further has a multiclad delivery fiber configured with a double-bottle neck cross-section and provided with at least two concentric and radially spaced apart inner and outer cores. The inner core is coupled to the peripheral guiding fibers while the inner core is spliced to the central guiding fiber so that a system output emitted from the inner core of the delivery fiber has a different beam shape from the system output emitted from the outer core.

17 Claims, 3 Drawing Sheets

(56) References Cited

U.S. PATENT DOCUMENTS

| | | | | |
|---|---|---|---|---|
| 7,592,568 | B2* | 9/2009 | Varnham | B23K 26/0734 219/121.73 |
| 7,742,512 | B2* | 6/2010 | Spariosu | H01S 3/2383 372/9 |
| 7,839,901 | B2* | 11/2010 | Meleshkevich | G02B 6/03616 385/124 |
| 7,839,902 | B2* | 11/2010 | Li | B23K 26/064 372/6 |
| 8,628,227 | B2* | 1/2014 | Olschowsky | G02B 27/0994 362/553 |
| 8,781,269 | B2* | 7/2014 | Huber | G02B 6/3508 385/18 |
| 9,250,390 | B2* | 2/2016 | Muendel | G02B 6/4216 |
| 9,366,872 | B2* | 6/2016 | Honea | G02B 27/30 |
| 9,482,821 | B2* | 11/2016 | Huber | G02B 6/4296 |
| 9,823,422 | B2* | 11/2017 | Muendel | G02B 6/4216 |
| 9,927,621 | B2* | 3/2018 | Honea | G02B 27/0944 |
| 10,088,632 | B2* | 10/2018 | Zhou | G02B 6/03644 |
| 10,153,608 | B2* | 12/2018 | Hemenway | H01S 5/02251 |
| 10,281,656 | B2* | 5/2019 | Huber | G02B 6/03644 |
| 10,295,845 | B2* | 5/2019 | Kliner | B23K 26/21 |
| 10,423,015 | B2* | 9/2019 | Kliner | G02B 27/0933 |
| 10,520,671 | B2* | 12/2019 | Farrow | H01S 3/06729 |
| 10,663,767 | B2* | 5/2020 | Kliner | B33Y 10/00 |
| 10,732,440 | B2* | 8/2020 | Kliner | B29C 48/08 |
| 11,215,761 | B2* | 1/2022 | Huber | G02B 6/02042 |
| 11,886,052 | B2* | 1/2024 | Kliner | G02B 6/03694 |
| 2005/0169323 | A1* | 8/2005 | Spariosu | H01S 3/067 372/9 |
| 2006/0219673 | A1* | 10/2006 | Varnham | B23K 26/0734 219/121.85 |
| 2007/0041083 | A1* | 2/2007 | Di Teodoro | H01S 3/06708 359/333 |
| 2009/0175301 | A1* | 7/2009 | Li | B23K 26/064 372/6 |
| 2010/0135339 | A1* | 6/2010 | Meleshkevich | G02B 6/03616 385/124 |
| 2011/0064095 | A1* | 3/2011 | Gapontsev | H01S 3/0672 372/6 |
| 2013/0114285 | A1* | 5/2013 | Olschowsky | G02B 27/0994 29/428 |
| 2013/0148925 | A1* | 6/2013 | Muendel | G02B 6/4216 385/27 |
| 2013/0223792 | A1* | 8/2013 | Huber | G02B 6/3508 385/127 |
| 2015/0234195 | A1* | 8/2015 | Honea | G02B 27/0905 359/618 |
| 2015/0293306 | A1* | 10/2015 | Huber | G02B 6/03644 385/18 |
| 2016/0116679 | A1* | 4/2016 | Muendel | B23K 26/0626 385/11 |
| 2017/0031105 | A1* | 2/2017 | Huber | G02B 6/4296 |
| 2017/0068097 | A1* | 3/2017 | Honea | G02B 27/0944 |
| 2017/0271837 | A1* | 9/2017 | Hemenway | H01S 3/1001 |
| 2017/0293084 | A1* | 10/2017 | Zhou | G02B 6/32 |
| 2018/0088343 | A1* | 3/2018 | Kliner | B23K 26/704 |
| 2018/0088357 | A1* | 3/2018 | Kliner | H01S 5/0085 |
| 2018/0088358 | A1* | 3/2018 | Kliner | B23K 26/034 |
| 2018/0203185 | A1* | 7/2018 | Farrow | H01S 3/005 |
| 2019/0258009 | A1* | 8/2019 | Huber | G02B 6/262 |
| 2019/0258091 | A1* | 8/2019 | Kliner | G02B 6/02347 |
| 2020/0333640 | A1* | 10/2020 | Kliner | B33Y 50/02 |

OTHER PUBLICATIONS

Lei et al., Incoherent beam combining of fiber lasers by an all-fiber 7×1 signal combiner at a power level of 14 KW, Opt. Express 26, 10421-10427 (2018) (Year: 2018).*

* cited by examiner

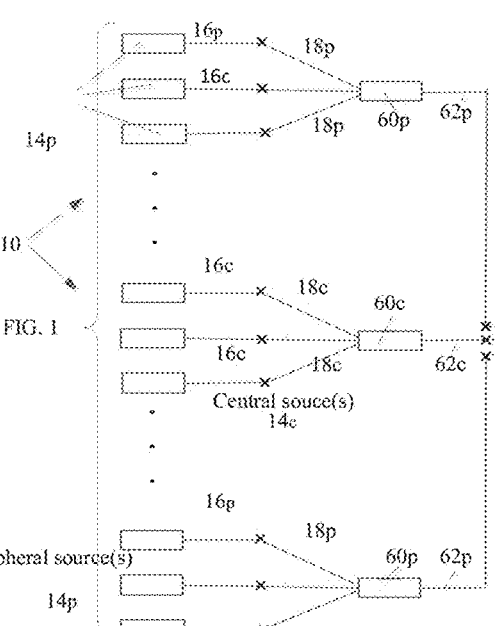
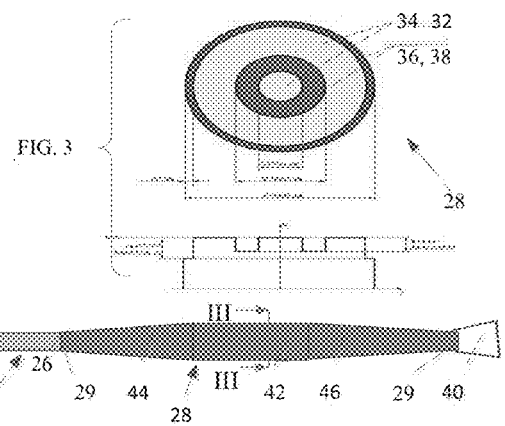
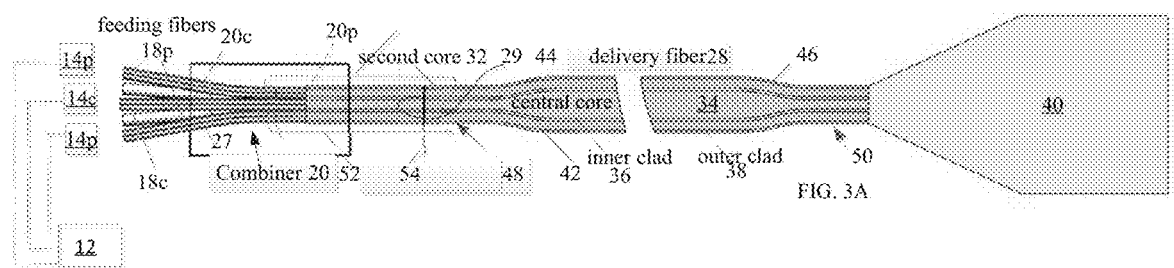

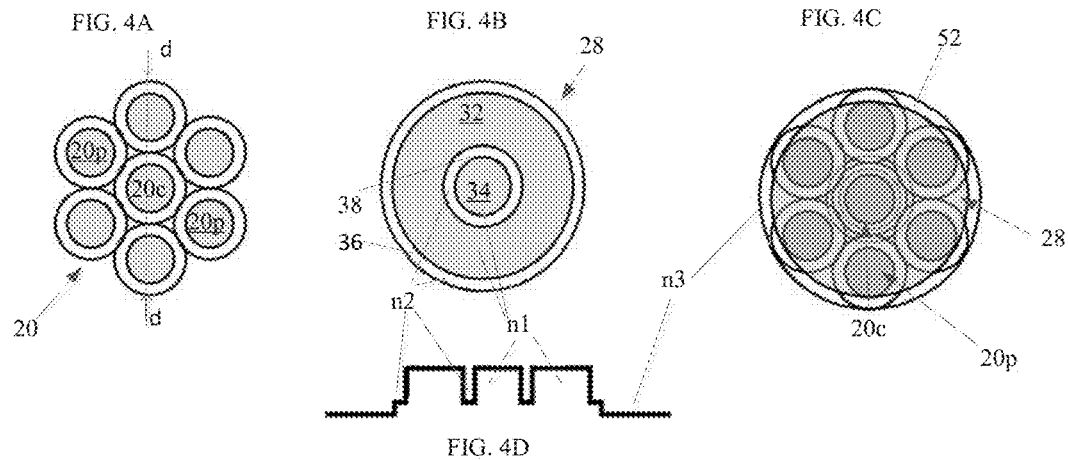
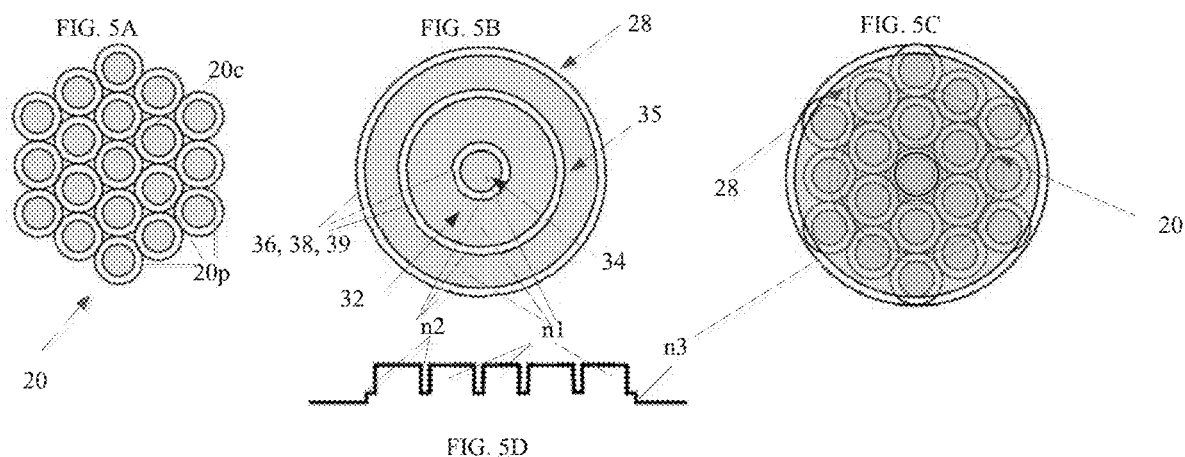

ULTRAHIGH POWER FIBER LASER SYSTEM WITH CONTROLLABLE OUTPUT BEAM INTENSITY PROFILE

BACKGROUND OF THE DISCLOSURE

Field of the Disclosure

The disclosure relates to ultrahigh power all-fiber laser systems. In particular, the disclosure relates to an ultrahigh power all fiber laser system operative to deliver beams with different intensity distribution profiles simultaneously or sequentially.

Background of the Disclosure

Ultrahigh fiber laser systems are known to output multi-kW high brightness output light. A typical high power fiber laser system has a large footprint since it includes multiple fiber laser modules which are combined together, and therefore is not easily maneuverable. Yet oftentimes it is necessary to deliver high power light to a remote, difficult to access location. For this reason, high power laser systems have a long delivery fiber which may be detrimental to the quality of light and fiber integrity due to numerous nonlinear effects.

The term "nonlinear", in optics, means intensity-dependent phenomena. Nonlinear effects in optical fibers occur due to (1) change in the refractive index of the medium with optical intensity, and (2) inelastic scattering phenomenon. The nonlinear effects depend on the transmission length. The longer the fiber link length, the more the light interaction and greater the nonlinear effect. The other factor affecting non-linearities in fibers is intensity, and the intensity is inversely proportional to the area of the core. The higher the intensity, the greater the nonlinear effects. These factors are invariably present in high power fiber laser systems and can detrimentally affect the system's output by decreasing g both its power and quality.

Often various solutions for cutting and welding material require various beam intensity profiles of the output beam. For example, it has been observed that cutting of metal can be performed at a much lower power, higher cutting speed and quality when using a "doughnut"-shaped profile instead of more conventional beam profiles, such as a "ring"-shaped profile. The "donut"-shaped is characterized by a relatively high intensity around the core's periphery and a relatively low intensity along the core's central (or axial) region.

Fiber laser systems configured with multiple fiber laser sources, which have respective output fibers combined into a single delivery fiber certainly, can meet this requirement. The combined output fibers outputting respective beams with different beam profiles are advantageous for a variety of industrial applications. For example, as mentioned above cutting metal of a given thickness can be performed at a much lower power, higher cutting speed and increased quality when using a doughnut beam instead of more conventional beam profiles.

U.S. Pat. No. 8,781,269 (US '269) discloses various arrangements to selectively couple several input beams from respective light sources into a multi-c as indicated below: lad fiber to generate different beam shapes of an output laser beam. The input beams propagate through free space and bulk switching optics before being electively coupled into the desired core and cladding regions of the feeding multi-clad fiber. The electivity is realized by the switching optic such that only one of multiple input beams can be coupled into the delivery fiber. The lasers disclosed in this reference are typically deployed in heavy industries associated with high mechanical and thermal stresses which are detrimental to optical systems utilizing bulk components. Furthermore, the light beams propagating through the bulk optics experience losses due to the reflection of the lens surface. Another factor that contributes to the decrease of the transmitted optical power through a lens is light scattering by surface roughness and glass imperfection within its volume. U.S. Pat. No. 7,130,113 teaches the arrangement similar to that of US '269.

WO2016198724 (WO '724) teaches propagating multiple individually controllable laser beams through one coaxial ring fiber, but in contrast to US '269, there are no bulk switching optics because the disclosed laser is an all-fiber design. The reference discloses a laser beam insert having central and peripheral channels which are traversed by respective delivery fibers further sliced to the cores and at least one cladding of the delivery fiber. The configuration of the combiner is complex and thus labor and cost ineffective.

The applicant has previously engaged in development of multibeam laser systems disclosed in WO 2016/025701US and WO 2016/200621 which are filed in Aug. 13, 2014 and May 26, 2015, respectively and fully incorporated herein by reference.

A need therefore exists for an ultra-high power all fiber laser with a long delivery fiber configured to output the ultra-high power laser beam in the remote locations.

Another need exists for the ultra-high power all fiber laser system having a simple configuration which allows providing a controllable composite output beam.

SUMMARY OF THE DISCLOSURE

These needs are satisfied by the disclosed ultra-high power all fiber laser system which includes numerous fiber laser sources which is only limited by practical considerations. The laser sources are arranged to have one or more central laser sources and other multiple laser sources, referred to as peripheral sources, which may flank, surround or just simply spaced from the central source(s) without any specific order.

The laser sources generate respective laser outputs guided along light paths through respective central and peripheral source output fibers, the downstream ends of which are spliced to respective feeding fibers. To prevent significant losses, the core ends of respective spliced output and feeding fibers are aligned with one another and uniformly dimensioned.

The feeding fibers are coupled to a tapered fiber-bundle including a plurality of guiding fibers which are fused together to define a fiber combiner. The fiber combiner, as known to one ordinary skill, is configured with a central guiding fiber, which is spliced to the downstream end of the central feeding fiber, and a plurality of peripheral guiding fibers surrounding the central guiding fiber and butt-spliced to respective peripheral feeding fibers. Structurally, thus, the fiber combiner has a large input face and an output face that is smaller than the input face.

In the disclosed system, the output face of the fiber combiner is spliced to a multicore delivery fiber, which allows light guided through peripheral fibers to be coupled into at least one second core while the light propagating through a train of spliced central fibers is coupled into the central core of the delivery fiber. The longitudinal cross-section of the delivery fiber has preferably a double bottle-neck shape which is configured with two relatively small input and output ends, a middle portion with a diameter larger than that of each end, and two tapered portion bridging the opposite ends of the middle portion and respective input and output ends. The disclosed structure allows the delivery fiber to be much longer than those of the prior art since the threshold for nonlinear effects is higher than the threshold observed in uniformly dimensioned delivery fibers due to the enlarged core diameter of the central portion.

The disclosed all fiber laser system includes multiple laser sources having respective feeding fibers which, in contrast to WO '724, are coupled together into a tapered combiner which is configured with one central fiber end and multiple peripheral fiber ends. The tapered combiner is directly spliced to a multicore delivery fiber which has the cores of respective central and peripheral fibers aligned with central and peripheral cores of the fiber combiner. The output end of the delivery fiber is in optical and mechanical contact with a quartz block. The all fiber connection between the feeding and delivery fibers eliminates the need in a complicated and labor-intensive fiber coupler of WO '724. Controlling the outputs of respective laser sources allows the delivery fiber to output a beam having a variety of beam shapes.

The laser sources can be configured as multimode, single mode or a combination of MM and SM sources, polarized and non-polarized sources. The laser sources are not limited to any particular power level and thus operate in a very broad range of powers from a few watts to hundreds of kW and, depending on the operational regime of any given laser source, up to one or more MWs. The operational regime may be selected from continuous wave (CW), quasi-continuous (QCW) and pulsed laser operations. The operational regimes within the scope of the disclosure may include all laser sources operating simultaneously or sequentially in the same operational regime or different operational regimes. Preferably, a laser source is a fiber laser, but pigtailed diode lasers, YAGs, disc lasers and any possible combination of laser configurations are within the scope of this disclosure. Common to all laser modifications covered by this disclosure is a fiber delivery system necessarily configured with a multicore delivery fiber. All of the above-disclosed laser configurations, as well as features disclosed above and discussed in detail below can be used in any combination with one another without deviating from the claimed subject matter of this disclosure.

BRIEF DESCRIPTION OF THE DRAWINGS

The above and other features of the disclosed fiber laser system will become more readily apparent from the specific description accompanied with the following drawings, in which:

FIG. 1 is a diagrammatic view of the disclosed fiber laser system configured in accordance with one modification;

FIG. 2 is a diagrammatic longitudinal section of the disclosed laser system configured in accordance with another modification;

FIG. 3 is a cross-sectional view of the delivery fiber taken along lines III-III of FIG. 2 and a refractive index profile thereof;

FIG. 4A is a cross-sectional view of the output face of the 7×1 fiber combiner;

FIG. 4B is a cross-sectional view of the delivery fiber of FIGS. 1-3;

FIG. 4C is the interface between spliced ends of the combiner and delivery fiber respectively;

FIG. 4D is a refractive index profile of the delivery fiber of FIG. 4B;

FIGS. 5A-5D correspond to respective views of FIGS. 4A-4D but for the 19×1 fiber combiner.

SPECIFIC DESCRIPTION

Figure 6A:
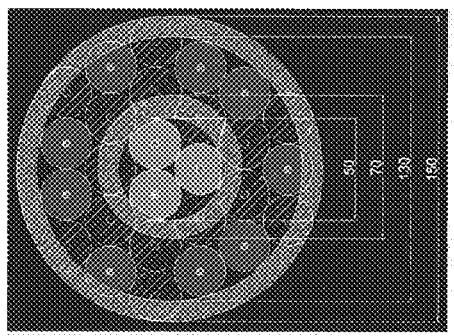
FIGS. 6A and 6B illustrate the cross-sectional views of the interface between the delivery fiber of FIGS. 1 and 2 and the combiner, provided with three central fibers.

Reference will now be made in detail to the embodiments of the invention. Wherever possible, same or similar reference numerals are used in the drawings and the description to refer to the same or like parts or steps. The drawings are in simplified form and are not to precise scale. For purposes of convenience and clarity only, directional (up/down, etc.) or motional (forward/back, etc.) terms may be used with respect to the drawings. The term "couple" and similar terms do not necessarily denote direct and immediate connections, but also include connections through intermediate elements or devices.

In accordance with the inventive concept shown in FIGS. 1, 2 and 3, the disclosed ultra-high power all fiber laser system 10 may include any number of fiber laser sources $14_p$-$14c$ limited only by practical considerations. The laser sources 14 are arranged in a configuration having one or more central lasers sources 14c and multiple peripheral laser sources 14p which may flank, surround or just simply be spaced from the central source(s) without any specific order. The operational regime of laser sources 14 may be selected from one of continuous wave (CW) or quasi CW (QCW) or pulsed regimes. The scope of the disclosure provides for laser sources 14 operate in respective different regimes or all source may have the same regime. For example, central laser 14c may be a QCW laser, whereas peripheral laser sources 14c can operate in a CW regime. The laser sources may output respective laser beams simultaneously or sequentially in a single transverse mode (SM) or multiple transverse modes (MM) which necessitates either SM fibers or MM fibers. The configuration including a combination of SM and MM laser sources along with respective SM and MM fibers is also contemplated within the scope of this disclosure. The output powers of respective laser sources 14 may be either the same or different from one another. The laser sources are controlled by a central processing unit 12 in a manner known to one of ordinary skill in software and laser arts. The configuration of individual laser sources may include a master oscillator power amplifier architecture or just an oscillator.

The laser sources 14 generate respective laser outputs guided along light paths through respective central and peripheral output fibers 16c and 16p, the downstream ends of which are spliced to respective feeding fibers 18c and 18p. To prevent losses, the cores of respective spliced output and feeding fibers are aligned with one another and uniformly dimensioned.

The feeding fibers 18p and 18c are coupled to a tapered fiber-bundle including a plurality of guiding fibers which are fused together to define a downstream tapered fiber bundle 20. The tapered fiber bundle, as known to one ordinary skill and shown in FIG. 2, is configured with a central guiding fiber 22c, which is spliced to the downstream end of central feeding fiber 18c, and a plurality of peripheral guiding fibers 22p surrounding central fiber 22c and spliced to peripheral feeding fibers 18p. The input and output faces 24 and 26 (FIG. 1), respectively, define therebetween the body of fiber bundle 20. Depending on the number of feeding fibers 18, fiber bundle 20 may have a 3×1 or 7×1 or 19×1 configuration or even more individual fibers 20c, 20p coupled to more than one second cores of delivery fiber 28 provided the technological circumstances allow the desired number of fibers 20. The reduction of input face 24 of fiber bundle 20 is determined by the outer peripheries of respective spaced and co-extending feeding fibers 18. A particularly advantageous ratio between input and output faces 24, 26, respectively, of combiner 20 may v within a 2 to 10 range. The determining factors of the actual reduction of face 26 include alignment and dimension of (1) the core of central feeding fiber 18c (FIG. 2) and central core 34 of delivery fiber 28, and (2) the cores of respective peripheral feeding fibers 18p as well as second core 32 of deliver fiber 28. Completing the structure of fiber bundle 20 is a protective sleeve 52 of polymer material covering the splice region between combiner 20 and delivery fiber 28 in a known to one of ordinary skill manner.

Referring to FIG. 3 in addition to FIGS. 1 and 2, output face 26 of downstream fiber fiber bundle 20 (FIG. 1) is spliced to a multicore delivery fiber 28. The latter is configured with at least two concentric cores. One of the cores is a central core 34 which receives light guided through a central fiber train including at least one output of central laser sources 14c and central fiber 20c of fiber bundle 20. At least one second core 32 of deliver fiber 28 receives light guided through outputs of respective peripheral laser sources 14p and central fiber 20p of bundle 20. The central and second cores 34, 32 respectively are separated by an inner cladding 36 which along with outer clad 38 sandwiches second core 32. The refractive index of delivery fiber 28 is shown at the bottom of FIG. 3 and includes a uniform index for both cores 32, 34 which is higher than a uniform index of inner and outer cladding 36, 38 respectively.

The longitudinal cross-section of delivery fiber 28, as shown in FIGS. 1 and 2, has preferably a double bottleneck shape which is configured with input and output tapered sections or portions 44, 46 gradually expanding inwards and terminating at a distance from one another. A mid-section 42 has a diameter larger than that of each input and output faces 29 of the delivery fiber and bridges tapered sections 44 and 46, respectively. The input and output sections 44, 46 each extend outwards directly from mid-section 42 of delivery fiber 28, as shown in FIG. 1. Alternatively, delivery fiber 28 may be provided with opposite input and output elongated cylindrical end sections 48, 50 (FIG. 2), respectively which extend outwards from input and output faces 29 (FIG. 1) of respective tapered portions 44, 46. The delivery fiber 28 may be up to at least 20 m long without showing any degradation in a 100 kW CW laser system 10. The protective sleeve 52 envelopes fiber bundle 20 and extends over its opposite faces 24 and 26, respectively to cover a splice 54 with delivery fiber 28 and at least downstream portions of respective feeding fibers (FIG. 2). An end block or beam expander 40 is spliced to the output face of delivery 28 and configured to minimize the environmental hazard in the known manner.

The feeding fibers 18c, 18p are disclosed above as being directly coupled to respective central and peripheral guiding fibers of downstream combiner 20. Alternatively, a plurality of central laser sources 14c and plurality of peripheral laser sources 14p may be grouped together, as shown in FIG. 1. The feeding fibers 18 guiding light from respective laser sources of each group are, in turn, coupled to respective second or upstream combiners 60. Accordingly, system 10 may be provided with central and peripheral combiners 60c and 60p having respective output fibers 62c and 62p spliced to central and peripheral guiding fibers of combiner 20.

Combining multiple laser outputs into a single output fiber of each combiner may increase the intensity of light delivered to downstream combiner 20. The number of feeding fibers 18 of each group may vary and limited only by technological and practical considerations. For example, FIG. 1 illustrates the 3×1 configuration of each combiner 60c, p. The delivery fiber 28 may be provided with a clad-mode absorber, as known in the art, which is configured to remove propagation of modes along the outer clad that can be detrimental to the protective layer of delivery fiber 28.

FIGS. 4A-4D in combination with FIGS. 1 and 2 illustrate respective cross-sections of the illustrated structure. In particular, FIG. 4A illustrates a cross-sectional view of output face 26 of 7×1 fiber bundle 20 provided with a central fiber 20c and six (6) peripheral fibers 20p around central fiber 20c. The inputs of respective fibers 20c and 20p are spliced to respective outputs of laser sources 14 of FIG. 1, and each fiber 20 guides the received light beam toward downstream face 26 of bundle 20. The latter is reduced such that individual beams delivered by respective peripheral fibers 20p are coupled into second core 32 of delivery fiber 28, whereas the central beam propagating along central fiber 20c enters into central core 34 of fiber 28, as shown in FIG. 4C. Turning to FIG. 4B, central core 34 has a diameter which is substantially equal to or greater than that of central guiding fiber 20c of FIG. 4A showing fiber bundle downstream face 26. The second core 32 of delivery fiber 28 is dimensioned to receive peripheral guiding fibers 20p of fiber bundle 20, as shown in FIG. 4C. The refractive index profile of delivery fiber 28 is illustrated in FIG. 4D.

FIGS. 5A-5D illustrate respective views corresponding to the views of respective FIGS. 4A-4D. However, the shown configurations of fiber bundle 20 includes nineteen (19) guiding fibers 20c and 20p arranged concentrically with the inner circle, which corresponds to central guiding fiber 20c, and the outer circle having twelve (12) peripheral guiding fibers 20p. The increased number of the guiding fibers may cause the modification of delivery fiber 28. As illustrated in FIGS. 5B and 5D, the latter is configured with central core 34 and two second cores 32 and 35. Three cladding 36, 38 and 39 compete the configuration of FIG. 5B. Similar to the configuration of FIGS. 4A-4D, the core diameters of respective guiding fiber 20c and central core 34 of delivery fiber 28 are dimensioned to match one another.

Referring briefly to FIGS. 4D and 5D, the refractive index of fiber 28 shown in FIGS. 4D, 5D includes refractive indices $n_1$ of respective central core and second core(s) equal to one another. However, the scope of the disclosure covers central and second cores configured with respective indices which differ from one another. Similarly, while inner and outer cladding 38, 36 and 39 are shown to have with a uniform refractive index $n_2$, it is foreseen that these claddings may have respective refractive indices not equal to one another.

Figure 6B:
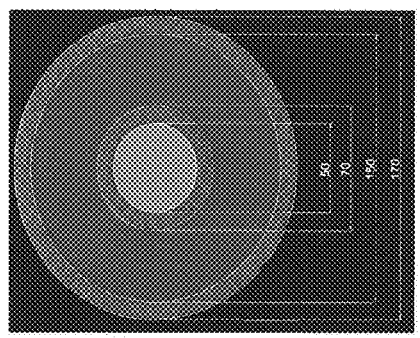

FIGS. 6A and 6B illustrate the cross-sectional views of fiber bundle 20 and delivery fiber 28, respectively. The difference between this modification and those shown in FIGS. 4 and 5 includes a different multiple central fibers 20c of fiber bundle 20. In particular, three (3) central fibers 20c together define an outer circumference matching the core diameter of central core 34 of delivery fiber 28.

Figure 7A:
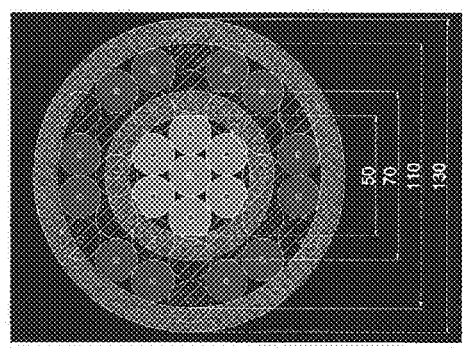
FIGS. 7A and 7B are similar to respective FIGS. 6A and 6B but with combiner having seven central fibers.
Figure 7B:
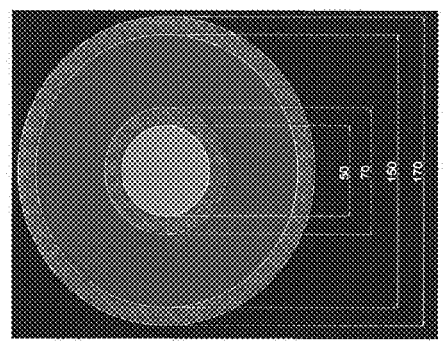

FIGS. 7A-7B are analogous to FIGS. 6A-6B respectively. However, fiber bundle 20 has a central zone defined by seven 7 central fibers 20c which define an outer circumference matching the core diameter of central core 32 of delivery fiber 28. Twelve guiding peripheral fibers 20p are spliced to second core 32 of delivery fiber 28 and, similar to all previously disclosed modifications, may radially extend into neighboring regions of respective claddings 36, 38 of delivery fiber 28.

As readily understood by one of ordinary skill in the laser arts, the number of central fibers 20c of fiber bundle 20 may be increased. The increased number of central fibers 20c, in turn, may require the increased core diameter of central core 34 of delivery fiber 28. Thus those peripheral fibers 20p of bundle 20 which are located close to central fiber 20 are aligned with inner second core 34 of fiber 28 and those fibers 20p located radially farther way from central fiber 20c are aligned with outer second core 35 of FIG. 5B. The core diameter of central core 34 of delivery fiber 28 may vary between 50µ and 100µ, whereas the outer diameter of delivery fiber 28 may range between 150µ and 300µ. These ranges, of course, are exemplary and may be adjusted in accordance with any given requirements. Note that in FIGS. 4-7, the output ends of respective fibers 20p, c of fiber bundle 20 are in mechanical contact with one another.

In use, controlling the lasers' output, light signals can be selectively guided through respective cores of feeding fibers 18 and coupled into the desired core or cores of delivery fiber 28 through respective fibers 20c, 20p of bundle 20. As a result, delivery fiber 28 outputs the system beam having the desired shape. The shape of the beam incident on the workpiece to be laser treated may be represented by only a full central spot if only one or more central feeding fibers 18c are utilized without the help of peripheral feeding fibers 18p. Alternatively, the shape may have one or multiple donut-shape beam or beams if only peripheral laser sources 14p and peripheral fibers 20p of bundle 20 are used. Of course, all source can be used simultaneously. Preferably, but not necessarily, all fibers of the combiner of FIGS. 4 and 7 are multimode (MM) fibers. Alternatively, only central fiber 20 is MM whereas all peripheral fibers 18 are single mode (SM) fibers. Obviously other combinations of MM and SM fibers can be utilized to match the required task.

One advantageous combination of laser sources $14_p$-$14c$ of FIG. 1 may include a "central" laser 14c which operates in a quasi-continuous (QCW) regime, whereas the "peripheral" lasers each output a CW beam. The central and peripheral lasers may operate simultaneously or sequentially. The QCW laser may be used, for example, as a piercing tool, whereas the CW peripheral lasers can be used for cutting. The configuration of FIGS. 1-7 may be applied to both the piercing and cutting of the workpiece by utilizing central concentric feeding fibers. Other possible combinations of operational laser regimes may include pulsed lasers in combination with either CW of QCW lasers. The peripheral lasers may be selectively utilized with one or more peripheral lasers not outputting beams.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

The invention claimed is:

1. An all fiber ultra-high power all fiber laser system, comprising:
at least one central and peripheral fiber laser sources controlled to selectively output respective central and peripheral laser beams;
a tapered fiber-bundle of central guiding fiber and a plurality of peripheral guiding fibers receiving respective central and peripheral laser beams; and
a multicore delivery fiber receiving central and peripheral bears from the tapered fiber bundle and having:
spaced input and output tapered portions converging towards respective outer ends,
a mid-portion bridging the spaced tapered portions, and
concentric central and second cores extending between the outer ends of respective tapering portions and spaced radially from one another and coupled to respective central and peripheral guiding fibers of the combiner, wherein the central core has an outer core diameter matching or greater than that of the central guiding fiber, and
inner and outer claddings concentric with and sandwiching the second core; wherein one of the laser beams propagates along a first fixed path through spliced cores of the central guiding fibers and further through the central core of the delivery fibers, and the remaining laser beams propagate along a second fixed path through respective cores of peripheral guiding fibers and further through the second core of the delivery fiber.

2. The laser system of claim 1 further comprising:
a plurality of central fiber lasers outputting respective multiple central laser beams,
a plurality of central feeding fibers receiving and guiding respective central beams, and
a plurality of central guiding and peripheral guiding fibers which are coupled directly or indirectly to respective central and peripheral feeding fibers.

3. The laser system of claim 2, wherein the central guiding fibers are butt-spliced to the central core of the delivery fiber.

4. The laser system of claim 2 further comprising multiple second fiber combiners each combining a group of at least two feeding fibers so that the central feeding fibers are combined in a central second fiber combiner while the peripheral feeding fibers are combined in a plurality of peripheral second fiber combiners, the second central and peripheral fiber combiners having respective output fibers butt-spliced to the central and peripheral guiding fibers of the combiner.

5. The laser system of claim 1 further comprising a controller coupled to and selectively energizing the fiber laser sources so that
only the central fiber laser source emits a laser beam propagating along the first fixed path so that an output of the central core of the delivery fiber has a ring-shaped intensity profiles, or
only one of or more peripheral fiber laser sources emit respective peripheral laser beams propagating along the second fixed path so that an output of the second core of the delivery fiber has a donut-shaped intensity profile, or
the central and peripheral fiber laser sources emit respective laser beams propagating along first and second paths so that outputs of respective central and second cores of the delivery fiber have respective ring and donut-shaped beam intensity profiles.

6. The laser system of claim 1 further comprising a quartz beam expander fused to the output end of the delivery fiber.

7. The laser system of claim 1, wherein the central and peripheral laser sources all operate in the same regime or different regimes, the regime including a continuous wave (CW), quasi-QW (QCW) or pulsed or a combination of different regimes.

8. The laser system of claim 7, wherein the peripheral fiber laser sources operate in a CW regime, while the central fiber laser source operates in a QCW regime.

9. The laser system of claim 1, wherein the central and peripheral fiber laser sources are energized simultaneously with one another or the central fiber laser source is energized before or after the peripheral fiber laser sources.

10. The laser system of claim 9, wherein the peripheral fiber laser sources are selectively energized.

11. The laser system of claim 1, wherein the central and peripheral laser sources output respective laser beams in a single transverse mode (SM) or multimode (MM), the laser sources each having a master oscillator power fiber amplifier (MOPFA) configuration, or an oscillator.

12. The laser system of claim 1, wherein the central and second cores of the delivery fiber have respective refractive indices, whereas the inner and outer claddings are configured with respective refractive indices which are lower than refractive indices of respective central and second cores.

13. The laser system of claim 12, wherein the refractive indices of respective central and peripheral cores of the delivery fiber are equal to or different from one another, and the refractive indices of respective inner and outer claddings are equal to or different from one another.

14. The laser system of claim 1, wherein the combiner has a 3×1, 7×1, 19×1 or 38×1 port configuration.

15. The laser system of claim 1, wherein an inner diameter of the central core of the delivery fiber ranges between 50 μm and 100 μm, the second core having an inner core diameter varying from 100μ to 300μ.

16. The laser system of claim 1 further comprises a protective sleeve surrounding the combiner and extending beyond the input and output faces to protect coupling regions between the tapered fiber bundle and feeding fibers and between the tapered fiber bundle and delivery fiber respectively, the protective sleeve being made from a polymer with a refractive index lower than that of the inner and outer claddings of the delivery fiber.

17. The laser system of claim 1 further comprising a multi-core input fiber insert having one end spliced to an output end of the tapered fiber bundle and an opposite end spliced to an end of the input tapered portion of the delivery fiber, wherein concentric central and peripheral cores of the fiber insert are dimensioned to match respective central and peripheral cores of the delivery fiber.

* * * * *